US010387639B2

(12) United States Patent
Jeon et al.

(10) Patent No.: US 10,387,639 B2
(45) Date of Patent: Aug. 20, 2019

(54) APPARATUS AND METHOD FOR API AUTHENTICATION USING TWO API TOKENS

(71) Applicant: ELECTRONICS AND TELECOMMUNICATIONS RESEARCH INSTITUTE, Daejeon-si (KR)

(72) Inventors: Hong Seok Jeon, Daejeon-si (KR); Bhum Cheol Lee, Daejeon-si (KR)

(73) Assignee: ELECTRONICS AND TELECOMMUNICATIONS RESEARCH INSTITUTE, Daejeon-si (KR)

( * ) Notice: Subject to any disclaimer, the term of this patent is extended or adjusted under 35 U.S.C. 154(b) by 127 days.

(21) Appl. No.: 15/373,376

(22) Filed: Dec. 8, 2016

(65) Prior Publication Data

US 2017/0161486 A1 Jun. 8, 2017

(30) Foreign Application Priority Data

Dec. 8, 2015 (KR) .......................... 10-2015-0174274

(51) Int. Cl.
*G06F 21/44* (2013.01)
*H04L 29/06* (2006.01)
(Continued)

(52) U.S. Cl.
CPC .............. *G06F 21/44* (2013.01); *G06F 21/33* (2013.01); *H04L 9/0643* (2013.01); *H04L 9/3213* (2013.01); *H04L 63/067* (2013.01); *H04L 63/083* (2013.01); *H04L 63/0807* (2013.01); *H04L 63/166* (2013.01);
(Continued)

(58) Field of Classification Search
CPC .............. H04L 63/0838; H04L 63/067; H04L 63/0846; H04L 2463/121; H04L 63/0807
See application file for complete search history.

(56) References Cited

U.S. PATENT DOCUMENTS 8,800,009 B1* 8/2014 Beda, III ............ H04L 63/0846
713/155
9,135,412 B1 9/2015 Talvensaari et al.
(Continued)

FOREIGN PATENT DOCUMENTS

KR 10-1460916 B1 11/2014
KR 10-2015-0007073 A 1/2015

OTHER PUBLICATIONS

M'Raihi, D., Machani, S., Pei, M. and Rydell, J., 2011. Totp: Time-based one-time password algorithm (No. RFC 6238). (Year: 2011).*

(Continued)

*Primary Examiner* — James R Turchen
(74) *Attorney, Agent, or Firm* — Rabin & Berdo, P.C.

(57) ABSTRACT

An application programming interface (API) authentication method using two API tokens which includes issuing a general API token and providing information required for a one-time API token to a user device; and in response to an API request from the user device, processing an API request according to a result of authentication based on the general API token and a one-time API token, which is generated using the information required for a one-time API token creation.

8 Claims, 8 Drawing Sheets

(51) Int. Cl.
    *H04L 9/06* (2006.01)
    *G06F 21/33* (2013.01)
    *H04L 9/32* (2006.01)

(52) U.S. Cl.
    CPC .. *G06F 2221/2137* (2013.01); *H04L 63/0838* (2013.01); *H04L 63/0846* (2013.01); *H04L 63/168* (2013.01); *H04L 2463/082* (2013.01); *H04L 2463/121* (2013.01)

(56) References Cited

U.S. PATENT DOCUMENTS

| | | | | |
|---|---|---|---|---|
| 9,178,880 | B1* | 11/2015 | Dotan | H04L 63/0876 |
| 9,639,692 | B1* | 5/2017 | Xue | G06F 21/46 |
| 9,805,182 | B1* | 10/2017 | Kayyidavazhiyil | G06F 21/36 |
| 9,819,665 | B1* | 11/2017 | Machani | H04L 63/08 |
| 9,906,558 | B2* | 2/2018 | Moore | H04L 63/20 |
| 2012/0131331 | A1* | 5/2012 | Benson | H04L 9/0844 713/155 |
| 2013/0268438 | A1* | 10/2013 | Boyle | G06Q 20/381 705/44 |
| 2013/0276078 | A1 | 10/2013 | Rockwell | |
| 2013/0276080 | A1* | 10/2013 | Nakonetzki | H04L 63/08 726/7 |
| 2014/0101733 | A1* | 4/2014 | Cain | G06F 21/41 726/5 |
| 2014/0222885 | A1* | 8/2014 | Mohan | H04L 63/02 709/201 |
| 2014/0230020 | A1* | 8/2014 | Mogaki | H04L 63/10 726/4 |
| 2014/0230023 | A1* | 8/2014 | Parks | G06F 21/41 726/4 |
| 2014/0281506 | A1* | 9/2014 | Redberg | H04L 63/067 713/159 |
| 2014/0351911 | A1* | 11/2014 | Yang | H04L 63/0838 726/7 |
| 2015/0039444 | A1* | 2/2015 | Hardin | G06Q 30/0273 705/14.69 |
| 2015/0281222 | A1* | 10/2015 | Burch | H04L 63/0838 726/6 |
| 2016/0014119 | A1* | 1/2016 | Inoue | H04L 63/0853 726/9 |
| 2016/0099924 | A1* | 4/2016 | Mehta | H04L 61/1576 726/7 |
| 2016/0224782 | A1* | 8/2016 | Miyakawa | G06F 21/45 |
| 2016/0261581 | A1* | 9/2016 | Wang | H04L 63/0272 |
| 2016/0301679 | A1* | 10/2016 | Mortimore, Jr. | H04L 63/083 |
| 2016/0359861 | A1* | 12/2016 | Manov | H04L 63/102 |
| 2017/0006471 | A1* | 1/2017 | Kim | G06F 21/45 |

OTHER PUBLICATIONS

Hardt, D., RFC 6749—The OAuth 2.0 Authorization Framework, 2012. Retrieved from the Internet, pp. 1-76. (Year: 2012).*
Jones, M. and Hardt, D., 2012. The oauth 2.0 authorization framework: Bearer token usage (No. RFC 6750). (Year: 2012).*
Using TOTP in the API client; retrieved from https://www.ibm.com/support/knowledgecenter/en/SSCT62/com.ibm.iamservice.doc/concepts/api_client_totp.html on Jun. 4, 2018; posted Oct. 24, 2014 (Year: 2014).*
Fritzdugan; Is it worth generating a new token after every request?; stackoverflow; May 23, 2014 (Year: 2014).*
SAFAD; API Authentication, One time token VS Dynamic tokens; stackoverflow; Jul. 19, 2013 (Year: 2013).*
Using TOTP in the API client; IBM Knowledge Center; Oct. 24, 2014 (Year: 2014).*
Matias Woloski; 10 Things You Should Know About Tokens; auth0.com; Jan. 27, 2014 (Year: 2014).*
D. M'Raihi et al., "TOTP: Time-Based One-Time Password Algorithm", Internet Engineering Task Force, May 2011.

* cited by examiner

APPARATUS AND METHOD FOR API
AUTHENTICATION USING TWO API
TOKENS

CROSS-REFERENCE TO RELATED
APPLICATION(S)

This application claims priority from Korean Patent Application No. 10-2015-0174274, filed on Dec. 8, 2015, in the Korean Intellectual Property Office, the disclosure of which is incorporated herein by reference in its entirety.

BACKGROUND

1. Field

The following description relates to a method of user authentication using an open application programing interface (API) provided over the Internet, and more particularly, to API authentication utilizing two tokens in an effort to prevent problem with lost tokens, which occurs in the existing API token authentication.

2. Description of Related Art

As focus on the information and communications technology (ICT) ecosystem has been reorganized based on platforms, an open application programing interface (API), which is one of the core functions of a platform, is becoming the most important asset for ICT businesses. In addition, with the growing popularity of web services, a REST API—an architectural style in API design known as 'representational state transfer (REST)'—is increasingly being employed.

In many cases, a REST API discloses resources related to a specific user. For instance, a processing method that contains personal information or is only intended to be executed by a limited user may be exposed to the public. Hence, in order to protect resources of the REST API, it is essential that authentication of a user or system that sends the API request be required.

Examples of web-based open API authentication methods include API key authentication, API token authentication, and a transport layer security (TLS) authentication.

The API key authentication is the most basic method, but rather than actually being an authentication method, it is a method for identifying programs that use an open API (e.g., mobile apps). Thus, a program developer receives a UUID or an API key in a unique text string from an API providing unit, and designs a program to include the received API key in an API message each time an API request is sent. Accordingly, the API providing unit is allowed to identify programs that send the API, and manage API usage information of each program. However, when different users use the same program, the same open API key value is shared among the users, thus putting the entire API at risk of exposure in a single instance.

Secondly, the API token authentication is an authentication method in which an API providing unit authenticates an API user based on the user's ID and password, and to whom a token with a validity period is issued once authenticated. Each time the API user sends an API request, an API message is sent, in which the received API token may be found. By using a temporary token, the API token method carries out user authentication without exposing the user ID and password, thus protecting user information and making the method advantageous. However, like other authentication methods, API token authentication does not encrypt API requests, and thus serious problems may arise such as a token being intercepted or used for malicious purposes.

Lastly, a method that can fundamentally resolve the aforesaid problems is encryption of an API request itself, for which, based on a certificate through two-way TLS, an API user is authenticated, all API messages are encrypted, and the messages are transmitted. This authentication method is the most advanced form of authentication, but increases the system load and an implementation method thereof; hence it is not used for general services.

For cloud computing operators or network function virtualization (NFV) service operators, APIs that are related to actual allocation of virtual resources must be vigilantly protected, because for them, token theft in the API token-based authentication method may directly lead to economic losses. Nevertheless, it is realistically difficult to force a certificate-based API authentication method forth all users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to an apparatus and method for application programing interface (API) authentication which can be implemented with low complexity and prevent token theft.

The following description also relates to an apparatus and method for API authentication, in which, along with a common API token, a one-time API token is provided in an API message, thereby reducing security risks due to token leakage.

In one genera aspect, there is provided an application programming interface (API) authentication method using two API tokens, the API authentication method including: obtaining, at a user device, a general API token and information required for a one-time API token creation from a service providing apparatus; and sending, at the user device, an API request to the service providing apparatus with both the general API token and a one-time API token, which is created based on the obtained information from the service providing apparatus.

In another general aspect, there is provided a user device including: an authentication information acquisition unit configured to acquire a general application programming interface (API) token and information required for a one-time API token creation from a service providing apparatus; and an API calling unit configured to send an API request to the service providing apparatus based on the obtained general API token and a one-time API token generated using the obtained information.

In yet another general aspect, there is provided a service providing apparatus including: an authentication information providing unit configured to issue a general API token to a user device and provide information required for a one-time API token creation; an authentication information database unit configured to map a user device name and its details about the general API token and one-time API token creation that have already been assigned to the user device and maintain mapping information; an API request processing unit configured to, in response to an API request that contains the general API token and the first one-time API token from the user device, request an authentication processing unit to authenticate the user device, and in response to an authentication result from the authentication processing unit, process an API request; and the authentication processing unit configured to, in response to the request from the API request processing unit, identify the user device based on the general API token, extract information required for a one-time API token creation to be mapped to the identified user device from the authentication information database unit, generate a second one-time API token using the extracted information, and output the authentication result according to whether the received first one-time API token is identical to the second one-time API token to the API request processing unit.

Other features and aspects will be apparent from the following detailed description, the drawings, and the claims.

Figure 1:
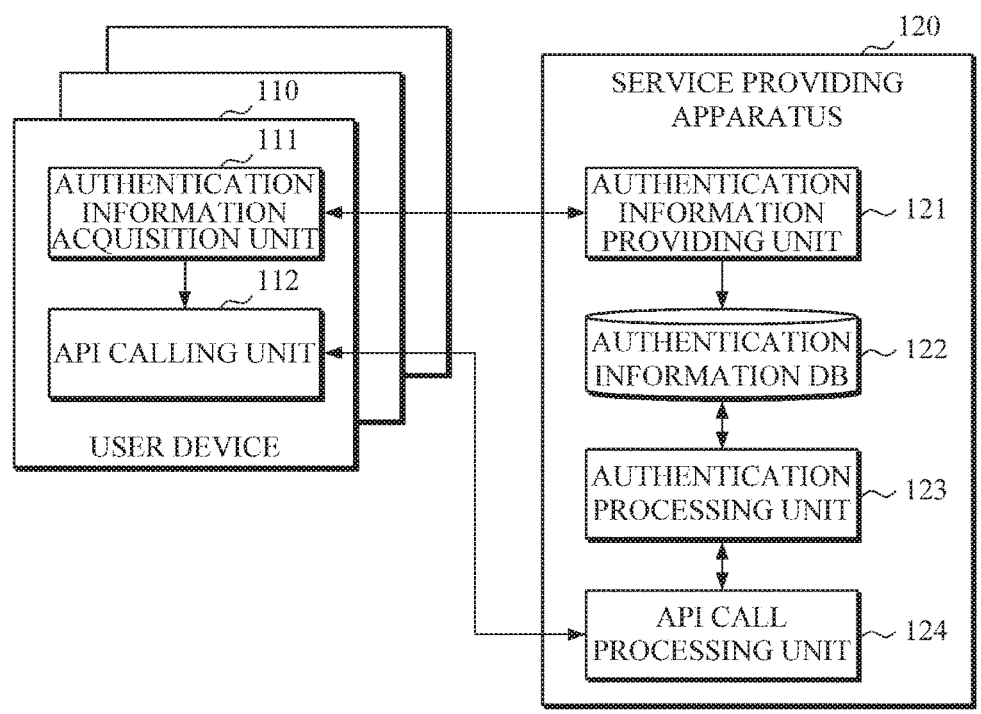
FIG. 1 is a diagram illustrating an application programming interface (API) service system according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an application programming interface (API) service system according to an exemplary embodiment.

Referring to FIG. 1, the API service system is configured to allow one or more user devices 110 to access a service providing apparatus 120 and request API call.

According to one exemplary embodiment, each user device 110 includes an authentication information acquisition unit 111 and an API calling unit 112. The authentication information acquisition unit 111 obtains information required for a one-time API token creation and a general API token. So in the case where a transport layer security (TLS)-based secure channel is set to be a one-way secure channel, the authentication information acquisition unit 111 may use a user ID and password to request the service providing apparatus to authenticate the user device 110. But if the TLS-based secure channel is set as a two-way secure channel, the authentication information acquisition unit 111 may, in the absence of a user ID and password, request the service providing apparatus 120 to issue a general API token and to provide information required for a one-time API token creation. Here, the information needed for generating a one-time API token includes a secret key, a cryptographic hash function, reference timestamp, and the unit of counting.

The API calling unit 112 sends the API request to the service providing apparatus using the general API token and a created one-time API token. The API calling unit 112 calculates an integer time-counter using the reference timestamp and the unit of counting; calculates a first one-time API token that is a hash value returned by applying both the calculated integer time-counter and the secret key to the cryptographic hash function; and then transmits the API request to the service providing apparatus 120, wherein the API request contains the general API token, the generated first one-time API token, and the user device's timestamp at the time of generating the first one-time API token.

The service providing apparatus 120 includes an authentication information providing unit 121, an authentication information database (DB) 122, an authentication processing unit 123, and an API request processing unit 124.

The authentication information providing unit 121 provides the user device 110 with the general API and the information required for a one-time API token creation. In this case, the authentication information providing unit 121 sets a TLS-based secure channel, whereby the general API token and the information required for a one-time API token creation are encrypted before transmission. Here, the information required for a one-time API token includes a secret key, a cryptographic hash function, reference timestamp, and the unit of counting.

The authentication information DB 122 maps the issued general API token and the provided information required for a one-time API token creation to the user device and stores the mapping information in the form of a table, an example of which is shown below as Table 1.

TABLE 1

| User Device ID | Issued General API Token | Secret Key | Cryptographic Hash Function | Reference Timestamp | Unit of Counting |
|---|---|---|---|---|---|
| 00 | Token_00 | Secret_key_00 | Hash_00 | Timestamp_00 | Time_count_00 |
| 01 | Token_01 | Secret_key_01 | Hash_01 | Timestamp_01 | Time_count_01 |
| 02 | Token_02 | Secret_key_02 | Hash_02 | Timestamp_02 | Time_count_02 |
| 03 | Token_03 | Secret_key_03 | Hash_03 | Timestamp_03 | Time_count_03 |

In response to a request from the API request processing unit 124, the authentication processing unit 123 identifies the user device 110 using the general API token; extracts the information required for a one-time API token creation, which is to be mapped to the identified user device 110 from the authentication information DB 122; generates a second one-time API token using the extracted information; and outputs the authentication result to the API request processing unit 124 about whether the first one-time API token received from the user device 110 is identical to the second one-time API token. In this case, the authentication processing unit 123 extracts the current timestamp from the API request, computes the integer time-counter using the current timestamp and the reference timestamp contained in the information required for a one-time API token creation; and calculates the second one-time API token by applying the computed integer time-counter and the secret key contained in the information required for a one-time API token creation to the cryptographic hash function. This process will be described later in detail with reference to FIGS. 2A and 2B.

In response to receiving the API request that contains the general API token and the first one-time API token from the user device 110, the API request processing unit 124 requests the authentication processing unit 123 to perform authentication for the API request, and according to the authentication result from the authentication processing unit 123, the API request processing unit 124 processes the API request sent from the user device 110. According to an exemplary embodiment, the API request further includes the current timestamp used for generating the first one-time API token.

Figure 2A:
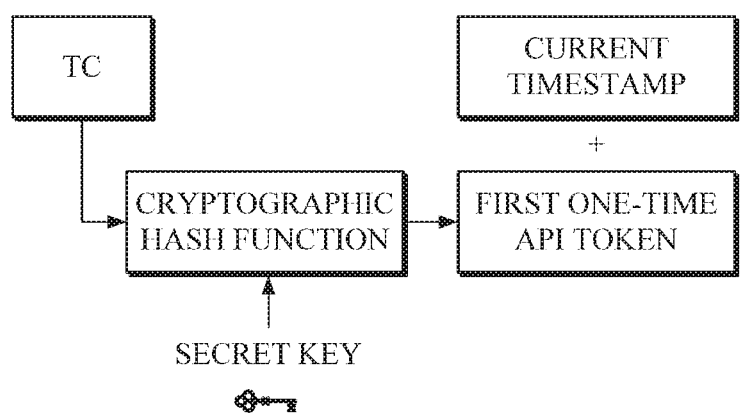
FIGS. 2A and 2B are diagrams for explaining generation of a one-time API token according to an exemplary embodiment.
Figure 2B:
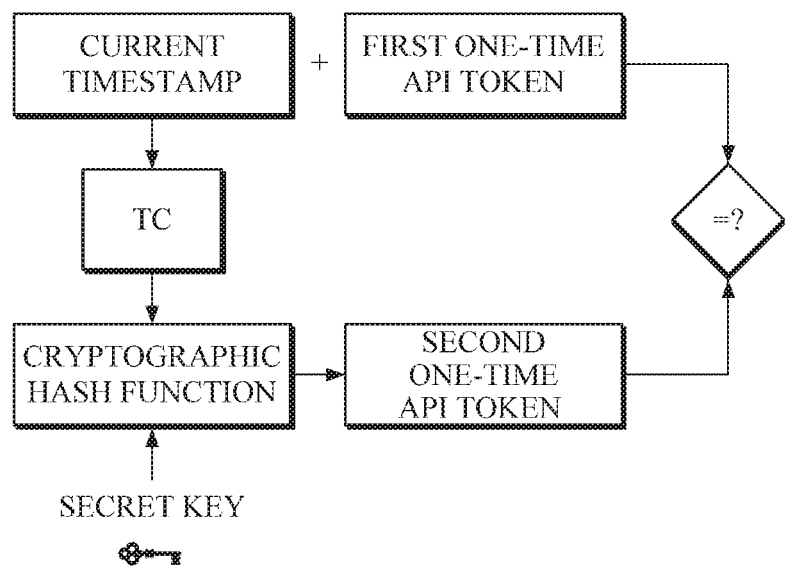

FIGS. 2A and 2B are diagrams for explaining generation of a one-time API token according to an exemplary embodiment.

Referring to FIGS. 2A and 2B, a one-time API token value generated by a time-based one-time password algorithm (TOTP) is a kind of hash-based message authentication code (HMAC), and is a hash value of a cryptographic hash function that has a secret key and the integer time-counter (TC) as input values.

The integer time-counter (TC) value is calculated using Equation 1, as shown below, by defining a reference timestamp and the unit of counting after obtaining the current timestamp of the system.

$$\text{IntegerTime-Counter}(TC) = \frac{(\text{Curernt Timestamp}(CT) - \text{Reference Timestamp})}{\text{UnitofCounting}}, \quad (1)$$

where the current timestamp (CT) is generally a timestamp value of the system at the time of computation of TC.

Generally, in the case of a time-synchronized one-time password (OTP) system, such as a TOTP system, the service providing apparatus 120 performs an additional process for time correction due to the discrepancy in system time between the user device 110 and the service providing apparatus 120.

To prevent the discrepancy in time between the user device 110 and the service providing apparatus 120 and reduce the load of the time correction process caused by such a time discrepancy, the user device 110 sends the API message that contains the current timestamp (CT) information used to generate the one-time API token value to the service providing apparatus 120, as shown in FIG. 2A.

The service providing apparatus 120, in turn, computes the integer TC using the received CT information, as shown in FIG. 2B. The service providing apparatus 120 generates the second one-time API token using both the computed integer TC and the secret key that corresponds to the user device 110, and compares the second one-time API token with the first one-time API token received from the user device 110 to determine whether they are identical to each other.

Figure 3:
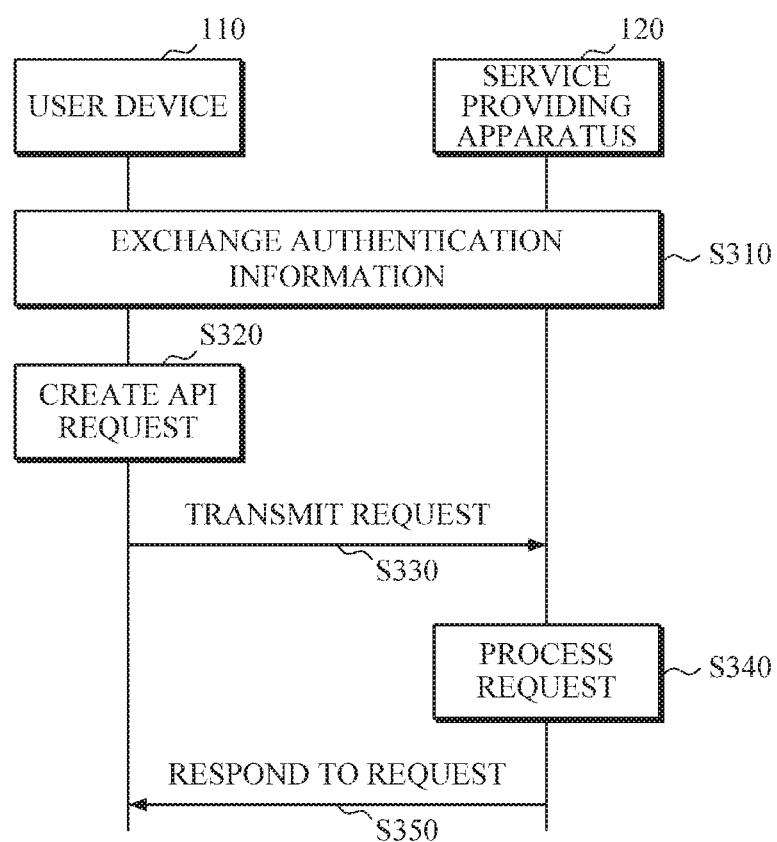
FIG. 3 is a flowchart illustrating a method for API authentication using two API tokens according to an exemplary embodiment.

FIG. 3 is a flowchart illustrating a method for API authentication using two API tokens according to an exemplary embodiment.

Referring to FIG. 3, the service providing apparatus 120 transmits information required for a one-time API token creation and a general API token to the user device 110, as depicted in S310. In this process, pieces of information for authentication of an API request sent by the user device 110 are exchanged beforehand, which will be described later in detail with reference to FIGS. 4 and 5.

In S310, after the pieces of information for API authentication have been exchanged, the user device 110 creates an API request when it needs to make an API call, as depicted in S320. This process will be described later in detail with reference to FIG. 6.

The user device 110 transmits the generated API request to the service providing apparatus 120, as depicted in S330.

In response to receiving the API request, the service providing apparatus 120 authenticates the API request using the general API token and the first one-time API token contained in the API request, as depicted in S340. This process will be described later in detail with reference to FIG. 7.

Thereafter, the service providing apparatus 120 responds to the API request according to the authentication result of S340, as depicted in S350.

The aforesaid processes S320, S330, S340, and S350 are repeatedly performed each time the user device 110 sends an API request to the service providing apparatus 120.

Hereinafter, the exchange of information for API authentication will be described with reference to FIGS. 4 and 5. The user device 110 and the service providing apparatus 120 establish a TLS-based secure channel between them, and transmit and receive information required for a one-time API token creation and the general API token in encrypted form, for which the channel may be either a one-way secure channel or a two-way secure channel.

Figure 4:
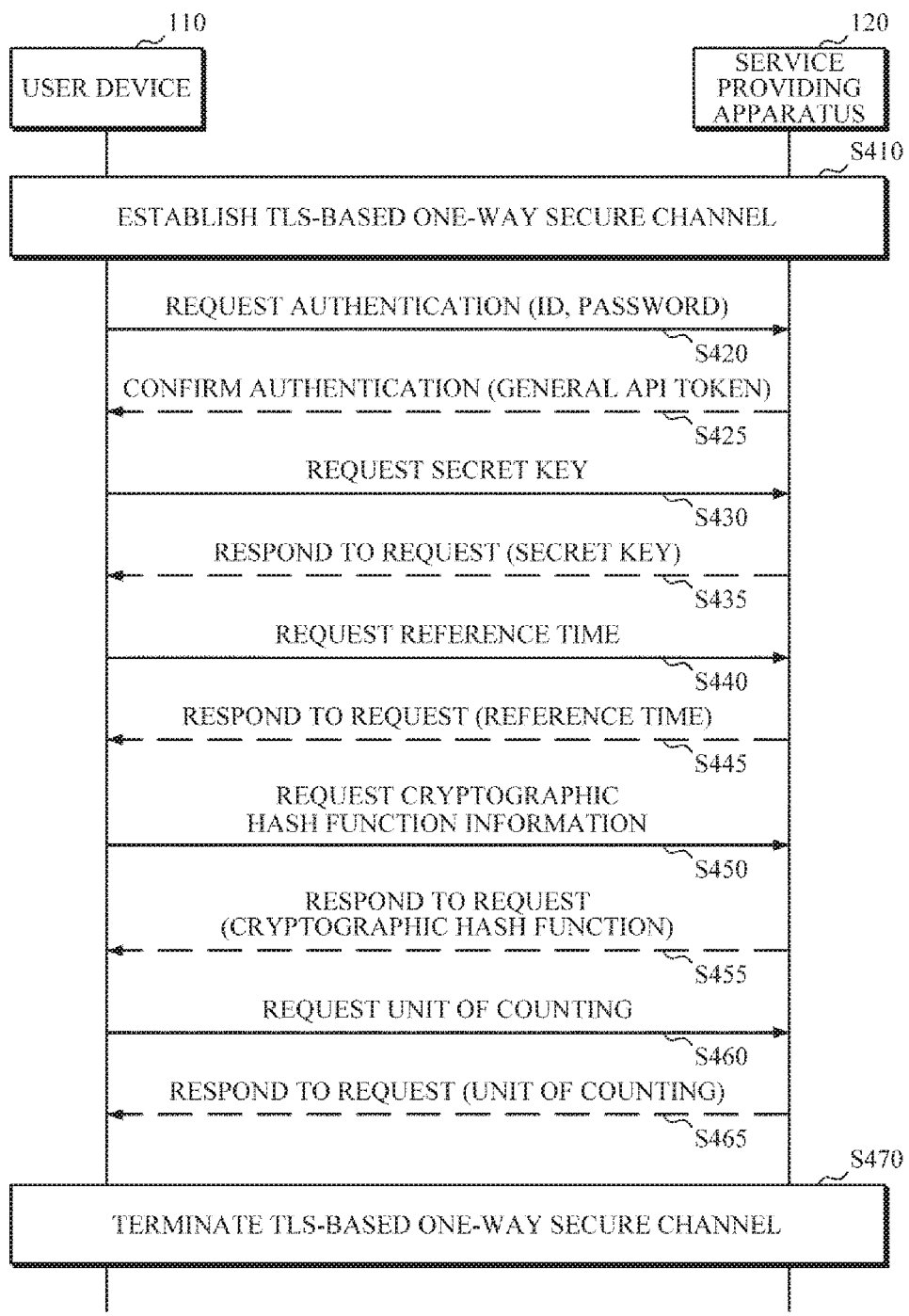
FIG. 4 is a signal flowchart for explaining procedures for exchanging information for authentication through a one-way secure channel in response to an API request according to an exemplary embodiment.

FIG. 4 is a signal flowchart for explaining procedures for exchanging information for authentication through a one-way secure channel in response to an API request according to an exemplary embodiment.

Referring to FIG. 4, the service providing apparatus 120 and the user device 110 establishes a TLS-based secure channel, as depicted in S410. At this time, the TLS-based secure channel is set to be a one-way secure channel. The one-way secure channel refers to one which is established by authenticating only the service providing apparatus 120 with a certificate. All messages are transmitted and received in encrypted form between the user device 110 and the service providing apparatus 120 over the TLS-based one-way secure channel.

Then, the user device 110 carries out the user device authentication by providing the user ID and password to the service providing apparatus 120, as depicted in S420, and the service providing apparatus 120 transmits an authentication confirmation message that contains a general API token in response to the request from the authenticated user device 110, as depicted in S425. Although not illustrated, if the user device 110 fails to be authenticated, the user device 110 re-attempts to request authentication, and if the authentication consistently fails, terminates the authentication request process.

Assuming that the user device 110 has been authenticated, the device 110 and the service providing apparatus 120 perform a handshake process to share information necessary for generating a one-time API token, as depicted in S430 to S465. Here, the information required for a one-time API token creation includes information about a reference timestamp, the unit of counting, a secret key, and a cryptographic hash function.

In response to a request for a secret key from the user device 110, as depicted in S430, the service providing apparatus 120 generates and provides a unique byte string to the user device 110, as depicted in S435. In response to a request for a reference time from the user device 110, the service providing apparatus 120 determines a reference timestamp for creating an appropriate time count and delivers it to the user device 110, as depicted in S445.

In response to a request for a cryptographic hash function from the user device 110, as depicted in S450, the service providing apparatus 120 provides cryptographic hash function information, as depicted in S455. At this time, the request for cryptographic hash function information transmitted from the user device 110 includes information about every type of cryptographic hash function supported by the user device 110, and the service providing apparatus 120 selects a cryptographic hash function to be used to generate a one-time API token from the cryptographic hash functions available to the user device 110, and sends a cryptographic function information response message to notify the user device 110 of the selected cryptographic hash function.

Then, in response to a request for the unit of counting from the user device 110, as depicted in S460, the service providing apparatus 120 determines the unit of counting and transmits it to the user device 110, as depicted in S465.

Furthermore, although not illustrated, the service providing apparatus 120 maps both the information required for a one-time API token creation shared with the user device 110 and the API token information issued by the user device 110 to the user device 110, stores the mapped information in the DB, and manages the DB.

Once the general API token has been issued and the handshake process is complete, the one-way secure channel between the user device 110 and the service providing apparatus 120 is terminated, as depicted in S470. Then, API messages to be exchanged thereafter between the user device 110 and the service providing apparatus 120 are transmitted in clear text.

Figure 5:
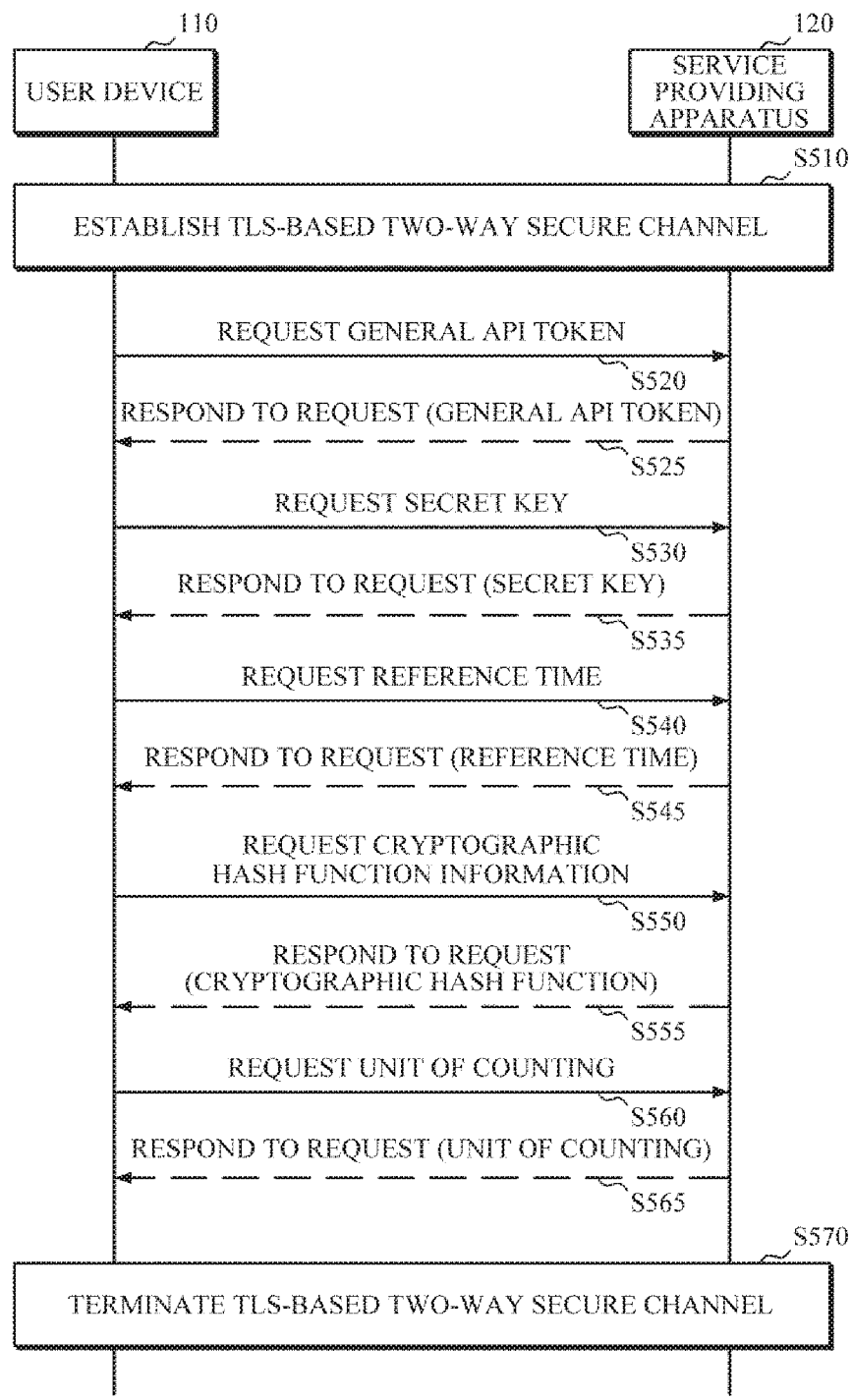
FIG. 5 is a signal flowchart for explaining procedures for exchanging information for authentication through a two-way secure channel in response to an API request according to an exemplary embodiment.

According to an exemplary embodiment, FIG. 5 is a signal flowchart for explaining procedures for exchanging information for authentication through a two-way secure channel in response to an API call.

Referring to FIG. 5, the service providing apparatus 120 and the user device 110 establish a TLS-based secure channel between them, as depicted in S510. In this case, the TLS-based secure channel is set to be a two-way secure channel. The two-way secure channel refers to a channel established by authenticating the certificates of both the service providing apparatus 120 and the user device 110. All messages are transmitted and received in encrypted form between the user device 110 and the service providing apparatus 120 over the TLS-based two-way secure channel.

Then, the user device 110 requests the service providing apparatus 120 to issue a general API token, as depicted in S520, and in response to the request, the service providing apparatus 120 issues a general API token, as depicted in S525. At this time, although not illustrated, if the user device 110 fails to be authenticated, the user device 110 re-attempts authentication, and if the authentication consistently fails, terminates the authentication request process.

Assuming that the user device 110 has been authenticated, the device 110 and the service providing apparatus 120 perform a handshake process in order to share information necessary for generating a one-way API token, as depicted in S530 to 565. S530 to S565 are similar to S430 to S465 of FIG. 4, respectively, and hence the detailed descriptions thereof will not be reiterated.

Furthermore, although not illustrated, the service providing apparatus 120 maps both the information required for a one-time API token creation shared with the user device 110 and the API token information issued by the user device 110 to the user device 110, stores the resulting map in the DB, and manages the DB.

Once the general API token has been issued and the handshake process is complete, the two-way secure channel between the user device 110 and the service providing apparatus 120 is terminated. Then, API messages to be exchanged thereafter between the user device 110 and the service providing apparatus 120 are transmitted in clear text.

Figure 6:
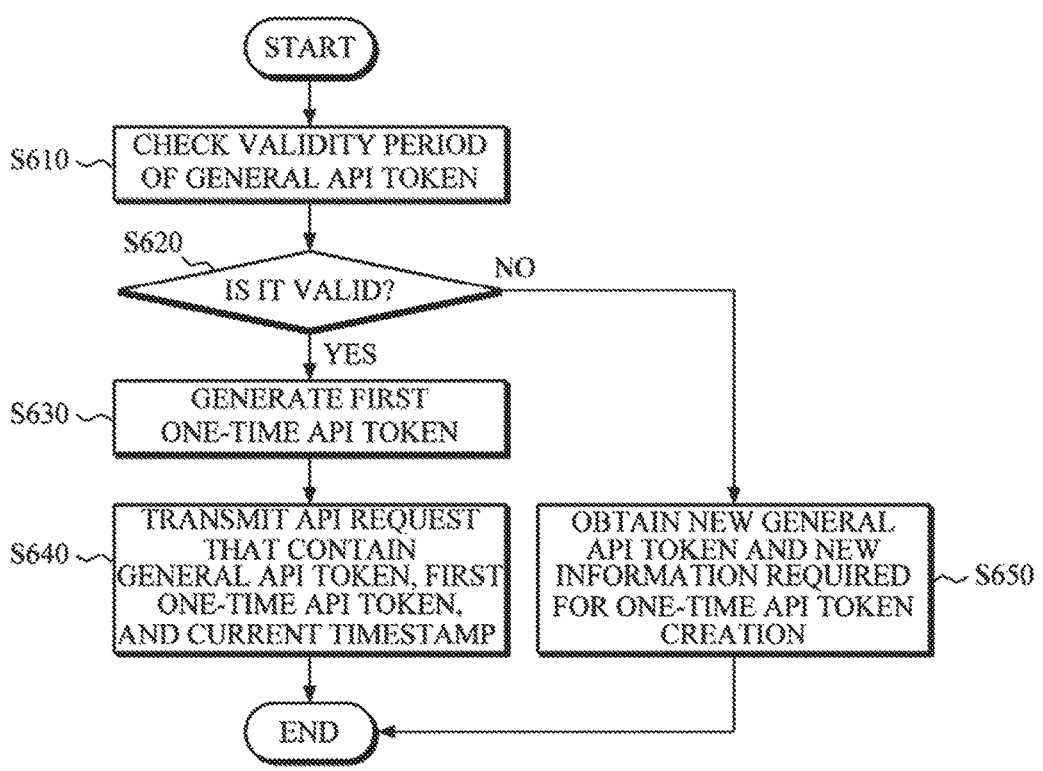
FIG. 6 is a flowchart for explaining an API request operation by a user device according to an exemplary embodiment.

FIG. 6 is a flowchart for explaining an API request operation by a user device according to an exemplary embodiment.

Referring to FIG. 6, the user device 110 checks whether a general API token has expired or not, as depicted in S610.

If the result of check in S610 turns out that the API token is still valid, the user device 110 generates a first one-time token using information required for a one-time API token creation, as depicted in S630. In more detail, the user device 110 computes an integer time-counter using a current timestamp, a reference timestamp, and the unit of counting; and calculates the first one-time API token that is a hash value returned by applying the computed integer time-counter and a secret key to a cryptographic hash function.

Thereafter, the user device 110 transmits an API request that contains the general API token and the first one-time API token to the service providing apparatus, as depicted in S640. Here, the API request further includes the current timestamp used for generating the first one-time API token.

If the result of check in S610 turns out that the general API token has expired and thus no longer valid, the user device 110 is issued a new general API token, and obtains information required for a new one-time API token creation (e.g., a secret key, a reference time, the unit of counting, a cryptographic hash function), as depicted in S650. The detailed procedures for receiving a newly issued general API token and the information required for a new one-time API token creation are described with reference to FIGS. 4 and 5.

Figure 7:
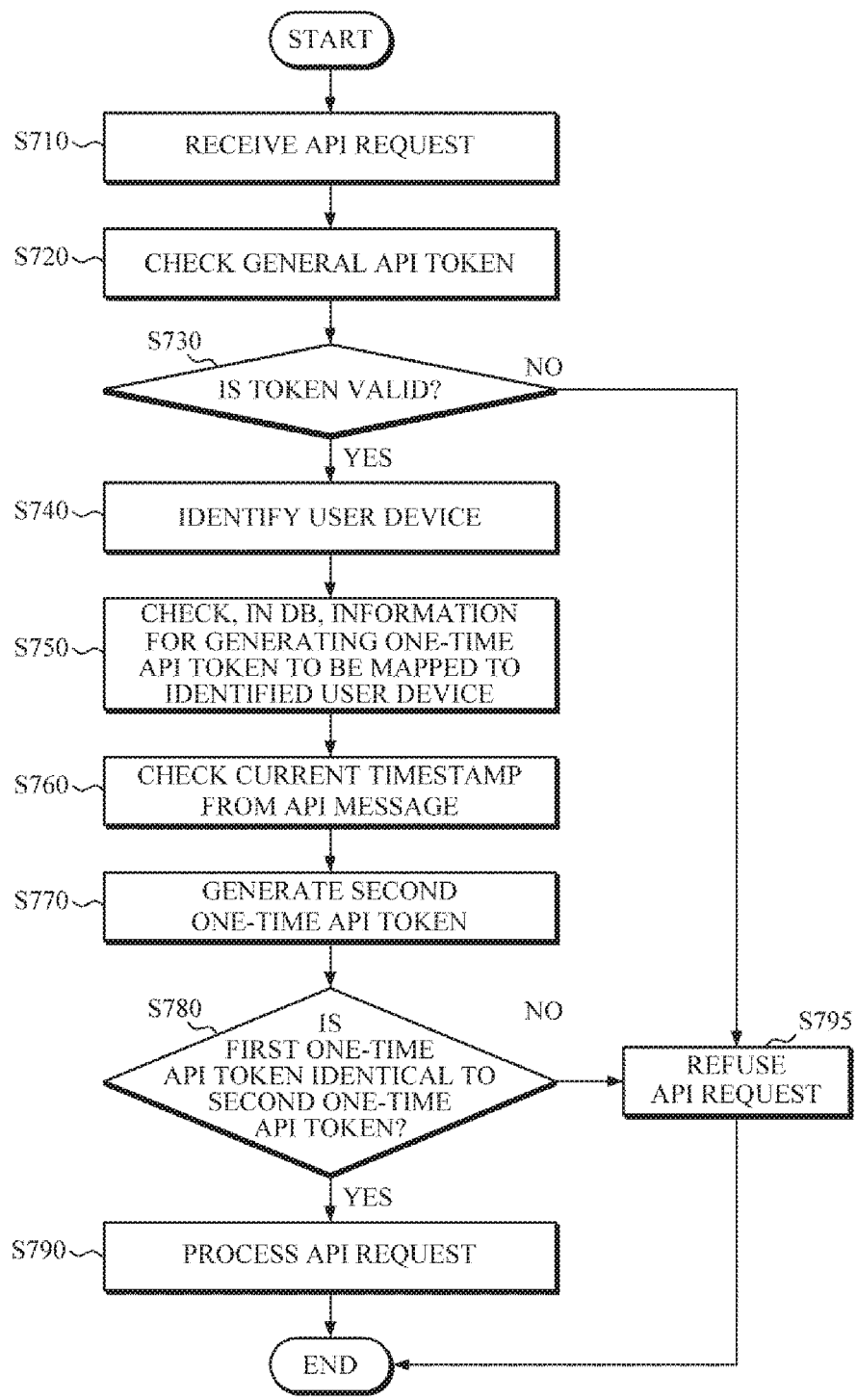
FIG. 7 is a flowchart that illustrates a service providing apparatus carrying out the process of authentication of a user device in response to an API request authentication for a user device by a service providing apparatus in response to an API request according to an exemplary embodiment.

FIG. 7 is a flowchart that illustrates a service providing apparatus carrying out the process of authentication of a user device in response to an API call, according to an exemplary embodiment.

Referring to FIG. 7, in response to receiving an API request as depicted in S710, the service providing apparatus 120 checks a general API token contained in the API request, as depicted in S720.

The service providing apparatus 120 checks whether the extracted general API token has expired or not, as depicted in S730.

If the result of the check in S730 turns out that the extracted general API token is still valid, the service providing apparatus 120 identifies the user device 110 that has transmitted the API request based on the general API token, as depicted in S740.

The service providing apparatus 120 extracts information required for a one-time API token creation which is mapped to the identified user device 110 from the DB, as depicted in S750. The information required for a one-time API token creation extracted from the DB includes information about a reference timestamp, the unit of counting, a secret key, and a cryptographic hash function.

The service providing apparatus 120 extracts current timestamp information from the received API request, as depicted in S760.

The service providing apparatus 120 computes an integer time-counter using the current timestamp extracted from the API request and the reference timestamp and the unit of counting, which are extracted from the DB; and calculates a second one-time API token by applying the computed integer time-counter and the secret key extracted from the DB to a cryptographic hash function confirmed from the information required for a one-time API token creation, as depicted in S770.

Thereafter, the service providing apparatus 120 checks whether the first one-time API token contained in the received API request is identical to the generated second one-time API token, as depicted in S780.

If the check result in S780 indicates that the first one-time API token is identical to the second one-time API token, the service providing apparatus 120 processes the received API request, as depicted in S790. Meanwhile, if the check result in S780 indicates that the first one-time API token is different from the second one-time API token, the service providing apparatus 120 refuses to process the API request, as depicted in S795.

Furthermore, if the result of the check in S730 indicates that the general API token has expired, the service providing apparatus 120 refuses to process the API request.

According to the exemplary embodiments described above, a safe API authentication method and system are provided, whereby even if an API token were to be stolen by a third entity, an API authentication request cannot be made using the stolen token. Also, a TLS-based secure channel is used only for preprocessing, and not for an API request process, and so the system load can be relatively reduced compared to a TLS-based API authentication method. In addition, although a TOTP-based one-time API token is used, no discrepancy in time between systems occurs and there is no load caused by a relevant time correction process.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An application programming interface (API) authentication method using two API tokens, the API authentication method comprising:
   obtaining, at a user device, a general API token and information required for a one-time API token creation from a service providing apparatus, the general API token having an expiration time;
   checking, at the user device, whether or not the general API token has expired, and
   upon determining that the general API token has expired, obtaining a new general API token and new information required for the one-time API token creation from the service providing apparatus, and
   upon determining that the general API token has not expired,
      creating the one-time API token using the obtained information from the service providing apparatus, and
      sending an API request to the service providing apparatus with both the general API token and the created one-time API token; and
   in response to the API request from the user device, processing, at the service providing apparatus, the API request according to a result of authentication based on the general API token and the one-time API token, wherein
   the processing of the API request comprises:
      receiving the API request that contains the first one-time API token and the general API token from the user device,
      identifying the user device with the general API token,
      extracting information required for one-time API token creation which is to be mapped to the identified user device in mapping information,
      generating a second one-time API token using the extracted information,
      checking whether the first one-time API token is identical to the second one-time API token, and
      processing the API request according to a result of the checking.

2. The API authentication method of claim 1, wherein the obtaining of the general API token and the information required for a one-time API token creation comprises establishing a transport layer security (TLS)-based secure channel between the user device and the service providing apparatus to encrypt all transmitted data including the general API token and the information required for the one-time API token creation.

3. The API authentication method of claim 1, wherein the information required for a one-time API token creation comprises a secret key, a cryptographic hash function, a reference timestamp, and a unit of counting.

4. The API authentication method of claim 3, wherein the creating the first one-time token comprises
   computing an integer time-counter using a current timestamp of a user device, the received reference timestamp and unit of counting; and
   calculating the first one-time API token that is a hash value returned by applying the computed integer time-counter and the received secret key to the cryptographic hash function.

5. The API authentication method of claim 4, wherein the API request further comprises a current timestamp used at the time of generating the first one-time API token.

6. The API authentication method of claim 1, wherein the obtaining of the general API token and the information required for the one-time API token creation comprises
   mapping, at the service providing apparatus, a user device name and details thereof about the general API token and one-time API token creation that have already been assigned to the user device, and
   maintaining mapping information.

7. The API authentication method of claim 1, wherein the processing of the API request comprises
   checking the general API token received in the API request, and refusing the API request upon determining that the received general API token has expired.

8. The API authentication method of claim 1, wherein:

the API request further comprises a current timestamp used at the time of generating the first one-time API token, and the generating of the second one-time API token comprises:

extracting the current timestamp from the API request, computing an integer time-counter using the extracted current timestamp, a reference timestamp, and a unit of counting, the last two of which are contained in information required for the first one-time API token creation maintained in the service providing apparatus, and calculating the second one-time API token that is a hash value returned by applying the computed integer time-counter and a secret key contained in the information required for the first one-time API token creation to a cryptographic hash function identified based on the information.

\* \* \* \* \*